(12) United States Patent
Mbugua et al.

(10) Patent No.: US 11,597,249 B2
(45) Date of Patent: Mar. 7, 2023

(54) INTERNAL DAMPER SENSORS AS WELL AS DAMPER ASSEMBLIES AND SUSPENSION SYSTEMS INCLUDING SAME

(71) Applicant: FIRESTONE INDUSTRIAL PRODUCTS COMPANY, LLC, Nashville, TN (US)

(72) Inventors: Samuel N. Mbugua, Zionsville, IN (US); Graham R. Brookes, Noblesville, IN (US); Brian S. DeBruler, Cottontown, TN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 17/277,194

(22) PCT Filed: Sep. 5, 2019

(86) PCT No.: PCT/US2019/049751
§ 371 (c)(1),
(2) Date: Mar. 17, 2021

(87) PCT Pub. No.: WO2020/060768
PCT Pub. Date: Mar. 26, 2020

(65) Prior Publication Data
US 2022/0032705 A1 Feb. 3, 2022

Related U.S. Application Data

(60) Provisional application No. 62/732,886, filed on Sep. 18, 2018.

(51) Int. Cl.
*B60G 17/019* (2006.01)
*B60G 15/06* (2006.01)
(Continued)

(52) U.S. Cl.
CPC .......... *B60G 17/019* (2013.01); *B60G 15/06* (2013.01); *B60G 15/12* (2013.01);
(Continued)

(58) Field of Classification Search
CPC .. B60G 17/019; B60G 13/08; B60G 2202/24; B60G 2401/14; B60G 2500/30; F16F 9/3292; F16F 13/00; G01D 5/30
See application file for complete search history.

(56) References Cited

U.S. PATENT DOCUMENTS 3,795,291 A * 3/1974 Naito ..................... F16F 9/42
188/274
3,954,255 A * 5/1976 Keijzer ............... B60G 15/063
267/218
(Continued)

FOREIGN PATENT DOCUMENTS

DE 9308118 U1 8/1993
EP 1588872 B1 10/2005

OTHER PUBLICATIONS

International Search Report and Written Opinion dated Nov. 19, 2019 for corresponding International Application No. PCT/US2019/049751.

*Primary Examiner* — Frank B Vanaman
(74) *Attorney, Agent, or Firm* — Thomas R. Kingsbury; Matthew P. Dugan

(57) ABSTRACT

A damper assembly has a longitudinal axis and includes a damper housing with a side wall portion and an end wall portion defining a damping chamber containing a quantity of damping fluid. A photon source and a photon receptor are operatively disposed in optical communication with the non-gaseous damping fluid in the damping chamber. The photon source is operable to direct a photon through the non-gaseous damping fluid toward an associated target surface. The photon receptor is operable to receive the
(Continued)

photon reflected off the associated target surface through the non-gaseous damping fluid. A sensor suitable for such use as well as spring and damper assemblies and suspension systems are also included.

20 Claims, 3 Drawing Sheets

(51) Int. Cl.
| | |
|---|---|
| B60G 15/12 | (2006.01) |
| B60G 17/015 | (2006.01) |
| B60G 17/052 | (2006.01) |
| F16F 9/18 | (2006.01) |
| F16F 9/19 | (2006.01) |
| F16F 9/32 | (2006.01) |
| F16F 13/00 | (2006.01) |
| G01D 5/30 | (2006.01) |
| B60G 13/08 | (2006.01) |

(52) U.S. Cl.
CPC ....... *B60G 17/0155* (2013.01); *B60G 17/052* (2013.01); *F16F 9/182* (2013.01); *F16F 9/19* (2013.01); *F16F 9/3292* (2013.01); *F16F 13/00* (2013.01); *G01D 5/30* (2013.01); *B60G 13/08* (2013.01); *B60G 2202/24* (2013.01); *B60G 2204/112* (2013.01); *B60G 2204/62* (2013.01); *B60G 2206/41* (2013.01); *B60G 2400/252* (2013.01); *B60G 2401/14* (2013.01); *B60G 2500/30* (2013.01); *B60G 2600/182* (2013.01); *B60G 2800/162* (2013.01); *B60G 2800/914* (2013.01); *F16F 2222/12* (2013.01); *F16F 2230/0047* (2013.01); *F16F 2230/08* (2013.01); *F16F 2232/08* (2013.01)

(56) References Cited

U.S. PATENT DOCUMENTS

| | | | | |
|---|---|---|---|---|
| 4,159,422 | A * | 6/1979 | Okubo | G01D 5/30 |
| | | | | 33/366.16 |
| 4,752,799 | A * | 6/1988 | Stauffer | G01S 17/36 |
| | | | | 356/4.06 |
| 4,902,903 | A | 2/1990 | Segerson et al. | |
| 5,229,829 | A * | 7/1993 | Nihei | G01C 5/00 |
| | | | | 356/4.06 |
| 7,123,351 | B1 * | 10/2006 | Schaefer | G01C 3/08 |
| | | | | 356/4.07 |
| 2017/0182859 | A1 * | 6/2017 | Anderson | B60G 13/14 |
| 2019/0346004 | A1 * | 11/2019 | Higgins | B62J 45/42 |

* cited by examiner

INTERNAL DAMPER SENSORS AS WELL AS DAMPER ASSEMBLIES AND SUSPENSION SYSTEMS INCLUDING SAME

This application is the National Stage of International Application No. PCT/US2019/049751, filed on Sep. 5, 2019, which claims the benefit of priority from U.S. Provisional Patent Application No. 62/732,886, filed on Sep. 18, 2018, the subject matter of which is hereby incorporated herein by reference in its entirety.

BACKGROUND

The subject matter of the present disclosure broadly relates to the art of damping devices and, more particularly, to internal sensors operative to generate signals, data and/or other outputs having a relation to heights or distances associated with damper assemblies based on time-of-flight measurement of photons traveling through damping liquid contained within damper assemblies. Damper assemblies including such internal sensors as well as suspension systems including one or more of such damper assemblies are also included.

It will be appreciated that the subject sensors, as well as the damper assemblies and suspension systems that include one or more of such sensors, are amenable to broad use in a wide variety of applications and environments. As examples, suitable applications and/or uses can include vehicle suspension systems, cab mounting arrangements and seat suspensions such as may be included on over-the-road trucks and tractors, rail vehicles, agricultural vehicles, industrial vehicles, as well as in other machinery having moving or vibrating parts. It will be appreciated that the subject matter of the present disclosure may be particularly amenable to use in connection with motorized vehicles, and will be discussed in detail hereinafter with specific reference thereto. However, it is to be specifically understood that the subject sensors, as well as the damper assemblies and suspension systems that include one or more of such sensors, are not intended to be in any way limited to this specific example of one suitable application, which is merely exemplary.

Wheeled motor vehicles of most types and kinds include a sprung mass, such as a body or chassis, for example, and an unsprung mass, such as two or more axles or other wheel-engaging members, for example, with a suspension system disposed therebetween. Typically, such a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In some cases, the spring devices of vehicle suspension systems can include so-called non-gas springs, such as coil springs, leaf springs and/or torsion springs, for example. In other cases, the spring devices can be of a type and kind that are commonly referred to in the art as gas spring assemblies, which are understood to utilize pressurized gas as the working medium thereof. Typically, such gas spring assemblies include a flexible spring member that is operatively connected between comparatively rigid end members to form a spring chamber. Pressurized gas can be transferred into and/or out of the spring chamber to alter the position of the sprung and unsprung masses relative to one another and/or to provide other performance-related characteristics. Additionally, a variety of devices and/or arrangements have been and are currently used to assist in controlling the transfer of pressurized gas into and/or out of one or more spring chambers and thereby adjust the position and/or orientation of one structural component of a vehicle relative to another structural component.

Height monitoring and/or control systems for vehicle suspensions have been developed that utilize height or distance sensors of various constructions to monitor and/or control the distance between two or more components of the vehicle and/or vehicle suspension system. In some cases, such sensors can be mounted on the vehicle external to other components of the suspension system. In other cases, internal height sensors can be used, such as may be housed within gas spring assemblies, for example. Such internal height sensors can utilize sound or pressure waves traveling through a gaseous medium (e.g., air) within the gas spring assemblies, typically at an ultrasonic frequency, to generate output signals suitable for determining the position of one structural member relative to another structural member. As an example of such an application, an ultrasonic sensor could be supported on one end member of a gas spring assembly. The ultrasonic sensor can be operative to send ultrasonic waves through the spring chamber of the gas spring assembly toward an opposing end member. The waves are reflected back by a suitable structure of the opposing end member, and the distance therebetween is determined in a conventional manner.

One advantage of such arrangements over conventional external sensors is that such internal sensors are least partially sheltered from impacts with road debris and/or other foreign objects as well as from exposure to environmental conditions. It will be appreciated, however, that in many cases suspension systems of wheeled vehicles utilize non-gas spring devices, such as coil, leaf and/or torsion springs, for example. In such cases, a protected area within the non-gas springs is generally not available to house the height sensors. As such, conventional external sensing devices can be used and are commonly installed in areas of the vehicle that may be exposed to impacts with road debris and/or other foreign objects as well as from exposure to environmental conditions.

Notwithstanding the widespread usage and overall success of conventional external sensors and conventional internal sensors typically used in association with gas spring assemblies, it is believed that a need exists to address the foregoing and/or other challenges while providing comparable or improved performance, ease of manufacture, reduced cost of manufacture, and/or otherwise advancing the art of sensing devices associated with suspension systems of vehicles as well as damper assemblies including such sensing devices.

BRIEF SUMMARY

One example of a sensor in accordance with the subject matter of the present disclosure can include a wall portion having a first side adapted for fluid communication with an associated non-gaseous damping fluid and a second side opposite the first side. First and second lens portions can be secured on the wall portion in a substantially fluid-tight manner for optical communication through the wall portion while retaining the associated non-gaseous damping fluid along the first side of the wall portion. A photon source can be disposed along the second side of the wall portion in optical communication with the first lens portion. A photon receptor can be disposed along the second side of the wall portion in optical communication with the second lens portion. A processor can be communicatively coupled with the photon source and the photon receptor. The photon source can be operable to direct a photon through the first lens portion and the associated non-gaseous damping fluid toward an associated target surface. The photon receptor can be operable to generate a signal upon receiving the photon from the photon source once reflected off the associated target surface and traveling through the associated non-gaseous damping fluid. The processor can be operable to determine a relative distance or position of the associated target having a relationship to a time of flight of the photon between the photon source and the photon receptor.

One example of a damper assembly in accordance with the subject matter of the present disclosure can have a longitudinal axis and can include a damper housing with including a side wall portion and an end wall portion that at least partially define a damping chamber containing a quantity of non-gaseous damping fluid. A damper rod assembly can include a damper rod and a damper piston operatively connected to the damper rod. The damper rod assembly can be operatively engaged with the damper housing for reciprocal displacement relative thereto. A photon source can be operatively disposed in optical communication with the non-gaseous damping fluid in the damping chamber. A photon receptor can be operatively disposed in optical communication with the non-gaseous damping fluid in the damping chamber. The photon source can be operable to direct a photon through the non-gaseous damping fluid toward an associated target surface. The photon receptor can be operable receive the photon reflected off the associated target surface through the non-gaseous damping fluid.

Another example of a damper assembly in accordance with the subject matter of the present disclosure can have a longitudinal axis and can include a damper housing with a housing wall at least partially defining a damping chamber containing a quantity of non-gaseous damping fluid. The damper housing can extend lengthwise between a first end and a second end opposite the first end. A first end wall can be operatively connected with the housing wall along the first end and at least partially enclosing the housing chamber in fluid communication with the non-gaseous damping fluid. A second end wall can be operatively connected with the housing wall along the second end and at least partially enclosing the housing chamber. A damper rod assembly including a damper rod and a damper piston can be operatively connected to the damper rod. The damper rod assembly can be operatively engaged with the damper housing such that the damper piston and a first portion of the damper rod are disposed within the housing chamber in fluid communication with the non-gaseous damping fluid and a second portion of the damper rod is disposed outwardly of the housing chamber. First and second lens portions can be supported on one of the housing wall, the first end wall, the second end wall and the damper piston. The first and second lens portions can be disposed in fluid communication with the non-gaseous damping fluid. A photon source can be operatively disposed in optical communication with the first lens portion, and a photon receptor can be operatively disposed in optical communication with the second lens portion. The photon source can be operable to direct a photon through the first lens portion and the non-gaseous damping fluid toward an associated target surface. The photon receptor can be operable to receive the photon through the second lens portion after being reflected off the associated target surface and passing through the non-gaseous damping fluid.

In some cases, a damper assembly according to either of the two foregoing paragraphs can include a processor communicatively coupled with the photon source and the photon receptor. The photon receptor can be operable to generate a signal upon receiving the photon through the second lens portion. The processor can be operable to determine a distance having a relationship to a time of flight of the photon traveling from the photon source through the non-gaseous damping fluid and reflected off of the target surface to the photon receptor.

One example of a spring and damper assembly in accordance with the subject matter of the present disclosure can include a damper assembly according to any of the three foregoing paragraphs. A spring device can be axially-coextensive with the damper assembly and operatively connected thereto for simultaneous extension and compression of the spring device with the damper assembly.

One example of a suspension system in accordance with the subject matter of the present disclosure can be operatively connected between an associated sprung mass and an associated unsprung mass of an associated vehicle. The suspension system can include a spring device operatively connected between the associated sprung and unsprung masses. A damper assembly according to any of the foregoing paragraphs operatively connected between the associated sprung and unsprung masses. A control system can be communicatively coupled with at least one of the photon source and the photon receptor.

In some cases, the spring device can be a gas spring assembly that contains a quantity of pressurized gas. The suspension system can include a pressurized gas system that can include a pressurized gas source and a control device with the pressurized gas source in selective communication with the gas spring assembly such that the control system is operable to selectively transfer pressurized gas into and out of the gas spring assembly in response to determinations of a time difference between an emission of the photon from the photon source and a detection of the photon at the photon receptor.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
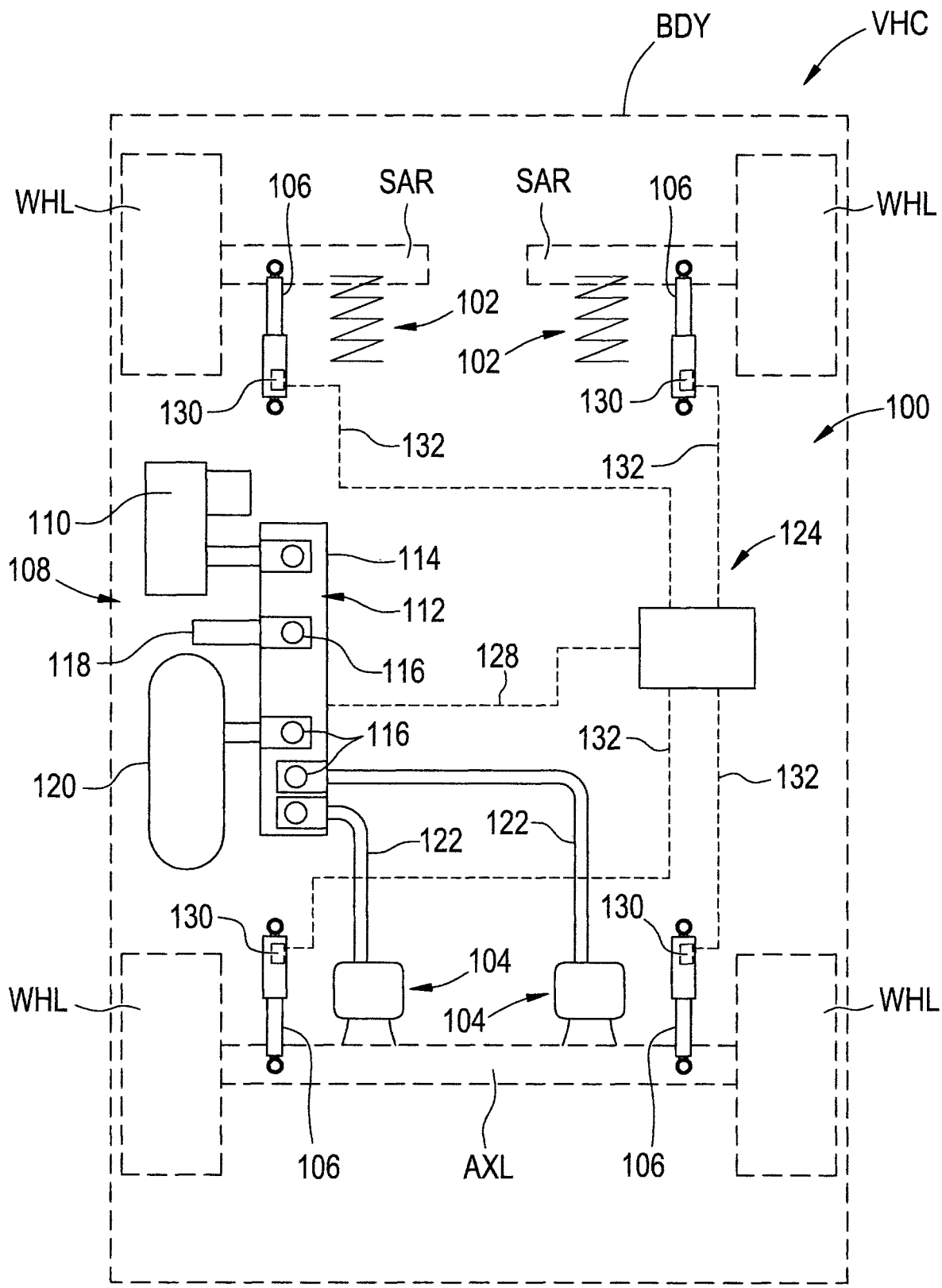
FIG. 1 is a schematic representation of one example of a vehicle including a suspension system with a plurality of springs, a plurality of damper assemblies and a plurality of sensors in accordance with the subject matter of the present disclosure.

FIG. 1 illustrates one example of a suspension system 100 disposed between a sprung mass, such as an associated body BDY, for example, and an unsprung mass, such as an associated wheel WHL, an associated suspension arm SAR or an associated axle AXL, for example, of an associated vehicle VHC. It will be appreciated that any one or more of the components of the suspension system can be operatively connected between the sprung and unsprung masses of the associated vehicle in any suitable manner.

Suspension system 100 can include any combination spring and damper devices operatively disposed between the sprung and unsprung masses of the associated vehicle. That is, suspension system 100 can include any combination of one or more non-fluid springs (e.g., leaf springs, coil springs, torsion springs) and/or gas spring devices operatively connected between the sprung and unsprung masses of the associated vehicle. Additionally, a suspension system in accordance with the subject matter of the present disclosure (e.g., suspension system 100) can include one or more damper assemblies in accordance with the subject matter of the present disclosure (e.g., shock absorbers, struts, force-adjustable and/or rate-adjustable damping devices) that are operatively connected between the sprung and unsprung masses. In some cases, the one or more dampers can be provided as separate components and secured between the sprung and unsprung masses independent from the one or more spring devices, such as are shown in FIG. 1, for example. In other cases, the one or more dampers can, optionally, be secured between the sprung and unsprung masses in conjunction (e.g., axially co-extensive) with the one or more spring devices.

In the arrangement shown in FIG. 1, suspension system 100 includes four spring devices with one spring device disposed toward each corner of vehicle VHC adjacent a corresponding one of wheels WHL. Suspension system 100 also includes four damping devices with one damping device disposed toward each corner of vehicle VHC adjacent a corresponding one of wheels WHL. It will be appreciated, however, that any other suitable number of spring devices and/or damping devices could alternately be used in any other configuration and/or arrangement. Additionally, it will be recognized that the type and kind of spring devices shown and described herein are merely exemplary and that spring devices of any other suitable types, kinds and/or constructions could alternately be used without departing from the subject matter of the present disclosure.

As shown in FIG. 1, suspension system 100 includes two non-fluid spring devices 102 that are shown as being disposed in operative association between vehicle body BDY and suspension arms SAR as well as two gas spring assemblies 104 that are shown as being disposed in operative association between vehicle body BDY and axle AXL. It will be recognized that the gas spring assemblies shown and described in FIG. 1 (e.g., gas spring assemblies 104) are illustrated as being of a rolling lobe-type construction. It is to be understood, however, that gas spring assemblies of other types, kinds and/or constructions could alternately be used. Suspension system 100 also includes one or more damper assemblies 106 in accordance with the subject matter of the present disclosure disposed in operative association between vehicle body BDY and suspension arms SAR and/or axle AXL adjacent one of wheels WHL.

In some cases, non-fluid spring devices 102 and gas spring assemblies 104 can be operatively connected between the vehicle body and the suspension arm or axle in spaced relation to or otherwise separately from damper assemblies 106, such as is shown in FIG. 1, for example. In other cases, however, the non-fluid spring devices and/or the gas spring assemblies can be secured in an axially-coextensive arrangement with damper assemblies 106. In some cases, constructions that include a spring device and a damper assembly operatively connected to one another in an axially-coextensive arrangement may be referred to herein as spring and damper assemblies.

Suspension system 100 can, optionally, include a pressurized gas system 108 operatively associated with the gas spring assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or the valve assembly and suitable for storing pressurized gas for an extended period of time (e.g., seconds, minutes, hours, days, weeks, months).

Valve assembly 112 is shown as being in communication with gas spring assemblies 104 through suitable gas transfer lines 122. As such, pressurized gas can be selectively transferred into and/or out of the gas spring assemblies through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring assemblies 104. Controller 126 can be of any suitable type, kind and/or configuration.

Figure 2:
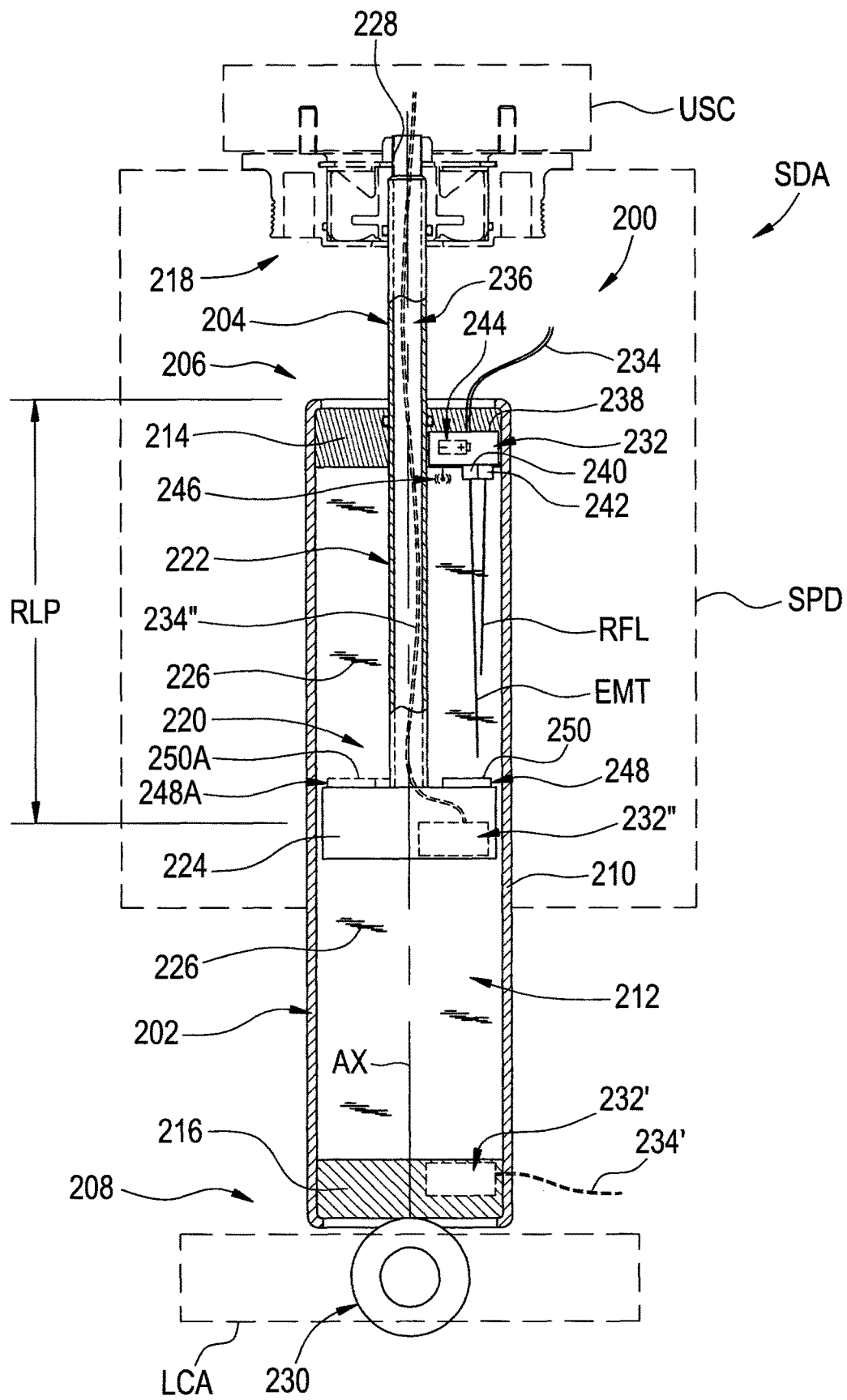
FIG. 2 is a side elevation view, in partial cross-section, of one example of a damper assembly including one example of a sensor in accordance with the subject matter of the present disclosure.

In accordance with the subject matter of the present disclosure, control system 124 can also include one or more sensing devices 130 (which are also referred to herein by terms such as sensors and the like), such as may be operatively associated with the damper assemblies and capable of outputting or otherwise generating data, signals and/or other communications having a relation to a height of the damping assemblies, a relative position of a predetermined component or to a distance between other components of the vehicle. Sensing devices 130 can be in communication with ECU 126, which can receive the height, distance and/or other signals therefrom. The sensing devices can be in communication with ECU 126 in any suitable manner, such as through conductors or leads 132, for example. In a preferred arrangement, in accordance with the subject matter of the present disclosure, sensing devices 130 are at least partially disposed within an associated one of damper assemblies 106, such as in fluid communication with a damping chamber and/or non-gaseous damping fluid thereof, such as is shown in FIGS. 1 and 2, for example. Additionally, sensing devices 130 are of a type, kind and/or construction that utilize time-of-flight measurement of photons to generate data, signals and/or other communications having a relation to a height of the damping assemblies, a relative position of a predetermined component, a distance between other components of the vehicle and/or one or more other properties and/or characteristics operatively associated therewith (e.g., acceleration).

One example of a damper assembly 200 in accordance with the subject matter of the present disclosure, such as may be suitable for use as damper assemblies 106 in FIG. 1, for example, is shown in FIG. 2 as having a longitudinally-extending axis AX and including a damper housing 202 and a damper rod assembly 204 that is at least partially received in the damper housing. As indicated above, a damper assembly in accordance with the subject matter of the present disclosure can, optionally, be assembled axially-coextensively with a spring device to form a spring and damper assembly, such as is represented in FIG. 2 as a spring and damper assembly SDA that includes a spring device (e.g., non-fluid spring device and/or gas spring assembly), which is schematically represented by dashed line SPD, operatively connected in an axially-coextensive arrangement with damper assembly 200.

Damper housing 202 can extend axially between opposing housing ends 206 and 208, and can include a housing wall (or wall portion) 210 that at least partially defines a damping chamber 212. An end wall (or wall portion) 214 can extend across or along end 206 of housing wall 210 and an end wall (or wall portion) 216 can extend across or along end 208 of the housing wall such that damping chamber 212 is at least partially defined therebetween. In some cases, one or more of the end walls can be integrally formed with the housing wall from a unitary piece of material (e.g., metal). In other cases, one or more of end walls 214 and 216 can be provided separately from housing wall 210 and secured together therewith in a suitable manner, such as by way of a flowed-material joint or a crimped connection, for example.

Damper rod assembly 204 can extend lengthwise between opposing ends 218 and 220 and can include an elongated damper rod 222 and a damper piston 224 disposed along end 220 of damper rod assembly 204. Damper piston 224 and a portion of the elongated damper rod are received within damping chamber 212 of damper housing 202 for reciprocal movement along the housing wall in a conventional manner. A quantity of non-gaseous damping fluid 226 (e.g., hydraulic oil or other suitable liquid) is disposed within damping chamber, and damper piston 224 can be displaced through the non-gaseous damping fluid to dissipate kinetic energy acting on damper assembly 200 in a conventional manner. As a non-limiting example, a relative position of damper housing 202 to damper rod assembly 204, such as with respect to damper piston 224 thereof, for example, is represented in FIG. 2 by reference dimension RLP, which schematically represents relative positioning between any to moveable components of damper assembly 200.

A portion of elongated damper rod 222 is shown in FIG. 2 as projecting out of damper housing 202 such that the elongated damper rod is outwardly exposed from the damper housing and is externally accessible with respect to the damper housing. A connection structure 228, such as a plurality of threads, for example, can be provided on or along the elongated damping rod toward end 218 for use in operatively securing the elongated damping rod to an associated component, such as an end member of a gas spring assembly, an upper mount of the damper assembly and/or a structural component of the associated vehicle.

It will be appreciated that damper assembly 200 can be operatively connected between associated sprung and unsprung masses of an associated vehicle (or other construction) in any suitable manner. For example, one end of the assembly can be operatively connected to the associated sprung mass with the other end of the assembly disposed toward and operatively connected to the associated unsprung mass. As shown in FIG. 2, for example, end 218 of elongated damper rod 222 can be secured on or along a first or upper structural component USC, such as an associated vehicle body, for example, and can be secured thereto in any suitable manner. As another example, end 208 of damper housing 202 can be secured on or along a second or lower structural component LSC, such as an associated axle or suspension structure of a vehicle, for example, and can be secured thereon in any suitable manner. In some cases, damper assembly 200 can include a connection structure 230, such as a pivot or bearing mount, for example, that is operatively disposed along damper housing 202 and is adapted for securement to lower structural component LSC in a suitable manner.

Damper assembly 200 is also shown in FIG. 2 as including a sensing device in accordance with the subject matter of the present disclosure operatively associated therewith. It will be appreciated that a sensor in accordance with the subject matter of the present disclosure can be operatively supported in optical communication with damping chamber 212 in any suitable manner, and on or along any one or more components, walls and/or wall portions of damper assembly 200. For example, in the arrangement shown in FIG. 2, a sensor 232 is shown as being disposed in optical communication with damping chamber 212 and supported on or along end wall 214. In some cases, a conductor or lead 234 can, optionally, be communicatively coupled with sensor 232 and could, for example, extend through end wall 214. As another example, a sensor 232' could be disposed in optical communication with damping chamber 212 and supported on or along end wall 216. In such case, a conductor or lead 234' can, optionally, be communicatively coupled with sensor 232' and could, for example, extend through housing wall 210. As a further example, a sensor 232" could be disposed in optical communication with damping chamber 212 from along damper piston 224. In such case, elongated damping rod 222 can include an elongated rod passage 236 extending lengthwise therethrough. A conductor or lead 234" can, optionally, be communicatively coupled with sensor 232" and could, for example, extend through elongated rod passage 236.

Sensors 232 (and 232', 232") include a sensor body or housing 238 with one or more walls and/or wall portions (e.g., walls and/or wall portions 336A in FIG. 3) that can be secured on or along the associated damper component in a suitable manner. In some cases, one or more sealing elements (e.g., sealing elements 336B in FIG. 3) can be disposed between sensor body 238 and the corresponding damper component such that a substantially fluid-tight seal can be formed and maintained therebetween. In accordance with the subject matter of the present disclosure, sensors 232 (and 232', 232") also include a photon source 240 and a photon receptor 242. In a preferred arrangement, such as is shown in FIG. 2, for example, the photon source and the photon receptor can be operatively disposed along a common damper component and in proximal relation to one another. However, it will be appreciated that other configurations and/or arrangements could alternately be used without departing from the subject matter of the present disclosure.

Additionally, it will be appreciated that sensors 232 (and 232', 232") can be communicatively coupled or otherwise connected to other systems and/or components of a vehicle suspension system in any suitable manner. For example, conductors 234 (and 234', 234") can be used to provide electrical power to the sensor and/or for communication purposes (e.g., signals, data and/or communication transfer to and/or from the sensor), such as is indicated by leads 132 of control system 124 in FIG. 1, for example. Additionally, or in the alternative, the sensor can include a self-contained power source (e.g., batteries) and/or an antenna suitable for wireless reception and/or transmission of signals, data and/or information for communication and/or other purposes, such as are represented in FIG. 2 by a power source 244 and/or an antenna 246, for example.

During use, in accordance with the subject matter of the present disclosure, sensor 232 is shown in FIG. 2 as being operable to emit photons from photon source 240 in a direction toward a target structure or component for which a height or distance is to be determined, as is represented by arrow EMT. The emitted photons are reflected off of the target structure or component in a direction back toward photon receptor 242, as is represented by arrow RFL. As such, it will be appreciated that in traveling from photon source 240 to photon receptor 242 the photons will move through the non-gaseous damping fluid (e.g., damping fluid 226) contained within the damping chamber (e.g., damping chamber 212), in accordance with the subject matter of the present disclosure.

In many cases, a sensor in accordance with the subject matter of the present disclosure will operate properly while reflecting photons off of a surface of the target structure or component itself. In some cases, however, it may be desirable to separately provide a reflective target having a target surface with predetermined reflective properties, such as may be useful to provide a particular level of performance or robustness of operation. For example, though optional, damper assembly 200 and/or sensors 232 (and 232', 232") can include a reflective target 248 having a target surface 250 off of which photons can be reflected from photon source 240 toward photon receptor 242, such as is shown in FIG. 2, for example. It will be appreciated that reflective target 248 and target surface 250 thereof can be of any suitable size, shape and/or configuration. For example, reflective target 248 is shown in FIG. 2 as being a spot target disposed in a desired position along damper piston 224 relative to sensor 232. In the alternative, a reflective target could be used that extends peripherally about axis AX such that an annular target surface is provided that will align with sensor 232 regardless of the rotational orientation of the sensor and the reflective target and/or target surface relative to one another about axis AX, such as is represented in FIG. 2 by dashed lines 248A and 250A, for example.

Depending upon the anticipated conditions of use in a particular application and the desired performance characteristics and/or robustness of operation, the target surface (whether a surface of the target structure or component or a dedicated reflective surface, such as target surface 250) can have one or more surface portions with a diffuse reflectance, a specular reflectance and/or a retroreflectance. As will be discussed in greater detail hereinafter, sensor 232 (and 232', 232") or a system or component operatively associated with the sensor, can be operable to determine time of flight of photons traveling at the speed of light (i.e., 299,700,000 meters per second in air) through the non-gaseous damping fluid (e.g., damping fluid 226) from the photon source, to the reflective surface and then to the photon receptor. It will be appreciated that the roundtrip distance traveled by the photons will have a relation to the time of flight. Thus, by determining the time of flight of the photons, sensor 232 (and 232', 232") or a system or component operatively associated with the sensor, can then determine a height or distance associated with the gas spring assembly or other components of a suspension system.

Figure 3:
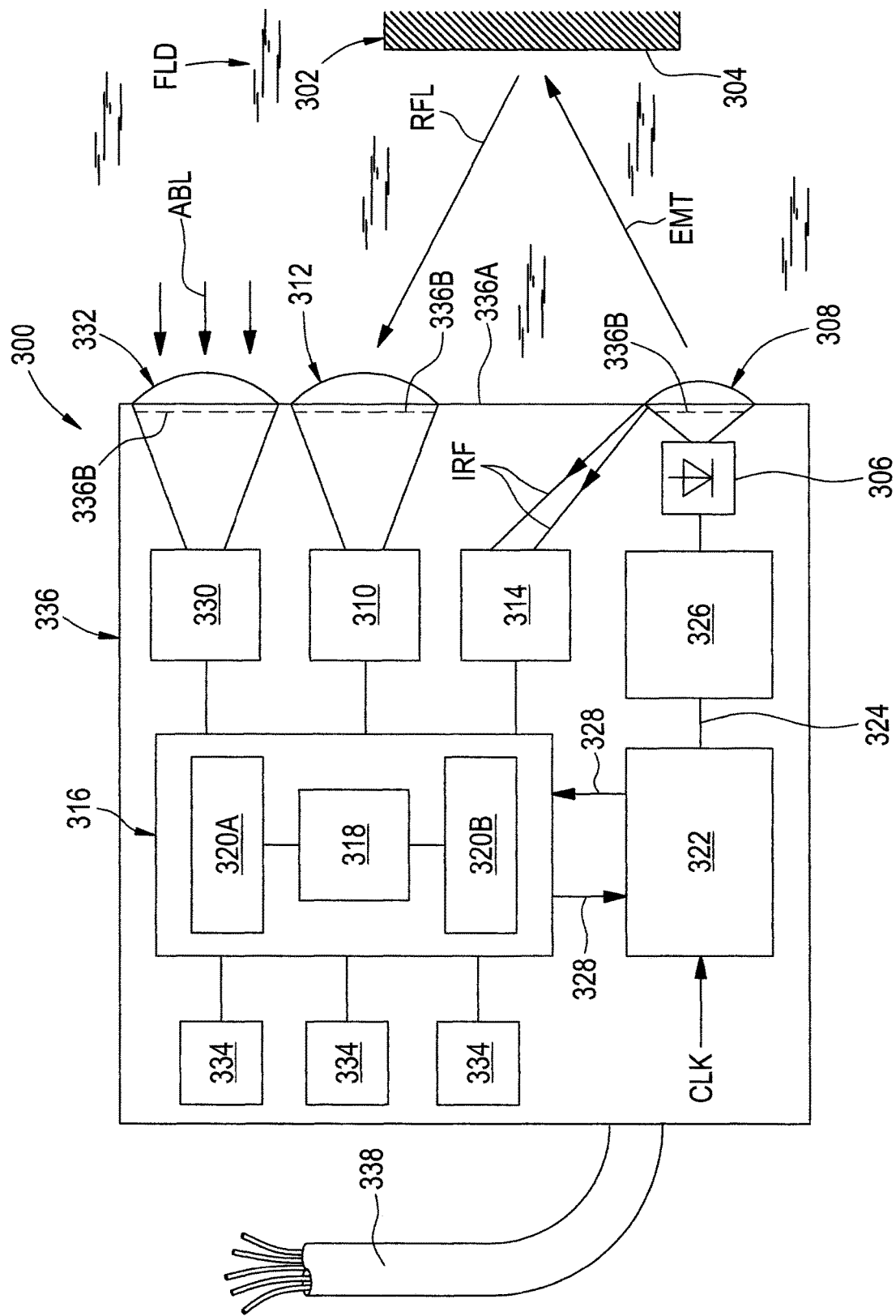
FIG. 3 is a schematic representation of one example of a sensor in accordance with the subject matter of the present disclosure.

FIG. 3 schematically illustrates one example of a sensor 300 in accordance with the subject matter of the present disclosure, such as may be suitable for use as one or more of sensors 130, 232, 232' and 232", for example. As discussed above, sensor 300 is preferably of a type, kind and/or construction that utilize time-of-flight measurement of photons to generate data, signals and/or other communications having a relation to a height of the damping assemblies, a relative position of a predetermined component, a distance between components of the vehicle or other structure and/or one or more other properties and/or characteristics operatively associated therewith (e.g., acceleration). In FIG. 3, a predetermined target 302 having a target surface 304, such as is suitable for use as reflective target 248 and target surface 250 in FIG. 2, for example, is disposed in spaced relation to sensor 300 such that a distance therebetween and/or other properties and/or characteristics can be determined by the sensor in accordance with the subject matter of the present disclosure.

Sensor 300 includes a photon source 306 that is operable to emit photons through a lens or lens portion 308 by directing the photons through a quantity of non-gaseous damping fluid (e.g., damping fluid 226) toward target surface 304, as is represented in FIG. 3 by arrow EMT. Sensor 300 also includes a photon receptor 310 that is operable to sense or otherwise detect the presence of photons received through a lens or lens portion 312, such as photons reflected off of target surface 304 and traveling through the quantity of non-gaseous damping fluid toward lens 312, as is represented in FIG. 3 by arrow RCV. Sensor 300 can also include a reference photon detector 314 that is operable to sense or otherwise detect the presence of photons received by way of a reflection of emitted photons that is internal to the sensor (i.e., internally-reflected photons), as is represented in FIG. 3 by arrows IRF. The sensor also includes a delay detector 316 that is operable to determine a time difference between the emission of photons from photon source 306 and the detection of emitted photons at photon receptor 310. Due to the travel of photons at the speed of light (through air at 299,700,000 meters per second), the time taken to travel from the photon source, to the target reflector and return to the photon detector through the non-gaseous damping fluid is extremely small. However, such a time difference is measurable.

Delay detector 316 can be constructed or otherwise provided in any suitable manner. As one example, a delay detection circuit could be used, such as is described in detail in U.S. Pat. No. 9,995,928, which issued on Oct. 6, 2016 in the names of STMicroelectronics Limited of Marlow Bucks, Great Britain and STMicroelectronics SAS of Grenoble, France, and entitled OPTICAL SIGNAL GENERATION IN A SPAD ARRAY BASED ON GENERATION OF A TARGET PHASE VALUE DEPENDENT UPON AN AMBIENT COUNT RATE. Alternately, the delay detector could include a combination of hardware, firmware and/or software operable to determine a time difference between the emission of photons from photon source 306 and the detection of emitted photons at photon receptor 310. For example, sensor 300 is shown in FIG. 3 as including a controller or processing device 318, which can be of any suitable type, kind and/or configuration, such as a microprocessor, for example, for processing data, executing software routines/programs, and other functions relating to at least the determination of a time difference between the emission of photons from photon source 306 and the detection of emitted photons at photon receptor 310.

Additionally, sensor 300 can include a non-transitory storage device or memory, which can be of any suitable type, kind and/or configuration that can be used to store data, values, settings, parameters, inputs, software, algorithms, routines, programs and/or other information or content for any associated use or function, such as use in association with the determination of a time difference between the emission of photons from photon source 306 and the detection of emitted photons at photon receptor 310 and/or with the performance and/or operation of sensor 300 as well as any systems, components and/or structures of the damper assemblies and/or suspension systems with which the sensor may be operatively associated.

As such, sensor 300 can include a non-transitory storage device or memory, which is represented in FIG. 3 by boxes 320A and 320B, that is suitable for data, values, settings, parameters, inputs, software, algorithms, routines, programs and/or other information or content for any associated use or function. Non-transitory memory stores 320A and 320B are communicatively coupled with processing device 318 such that the processing device can access the memory stores to retrieve and execute any one or more software programs and/or routines. Additionally, data, values, settings, parameters, inputs, software, algorithms, routines, programs and/or other information or content can also be retained within memory 320A and 320B for retrieval by processing device 318. It will be appreciated that such software routines can be individually executable routines or portions of a software program, such as an operating system, for example. Additionally, it will be appreciated that the control system, including any controller, processing device and/or memory, can take any suitable form, configuration and/or arrangement, and that the embodiments shown and described herein are merely exemplary. Furthermore, it is to be understood, however, that the operative constructions described above in detail can be implemented in any suitable manner, including, without limitation, software implementations, hardware implementations or any combination thereof.

Sensor 300 can also include any other components, circuits, data, values, settings, parameters, inputs, software, algorithms, routines, programs and/or other information or content for operation and use of the sensor. For example, sensor 300 can include a frequency generator 322 that can be implemented as any combination of circuitry and software. A clock signal CLK can be provided to frequency generator 322, which can generate a voltage signal 324 that is provided to a driver 326 for generating a signal for driving photon source 306. Delay detector 316 can also be operative to generate and communicate phase control signals 328 to frequency generator 322, such as is described in detail in U.S. Pat. No. 9,995,928 discussed above.

Sensor 300 can further include an ambient light sensor 330 that is operable to detect a level of ambient light in a surrounding environment through a lens or lens portion 332, such as is represented by arrows ABL in FIG. 3, for example.

Processing device 318 and memory stores 320A and 320B are preferably configured to detect and measure ambient light conditions through operation of ambient light sensor 330. In some cases, sensor 300 can also include one or more additional sensors and/or other components, such as are represented by boxes 334 in FIG. 3, which are communicatively coupled to processing device 318 and memory stores 320A and 320B. As non-limiting examples, boxes 334 can represent temperature sensors, pressure sensors, accelerometers and/or inertial measurement units. In some cases, sensor 300 can be contained in a sensor body or housing 336, which can include one or more walls and/or wall portions 336A, such as has been discussed above in detail for example in connection with other embodiments. In some cases, a seal or other substantially fluid-tight joint can be operatively disposed between one or more of lenses 308, 312 and/or 322 and wall portion 336A, such as is represented in FIG. 3 by dashed lines 336B. Additionally, sensor 300 can be communicatively coupled with other systems and/or components (e.g., controller 126 in FIG. 1) in any suitable manner. For example, the sensor can include one or more leads or conductors 338 that are communicatively coupled with one or more components of the sensor.

Using such an arrangement, sensor 300 can function as an extremely accurate ride height sensor that is capable of providing signals, data and/or other information regarding an average relative distance between damper components and/or other components of a vehicle or other structure. Advantageously, sensor 300 can accomplish these and other functions from the enclosed environment of the interior of a damper assembly that contains hydraulic or other non-gaseous damping fluid (e.g., damping fluid 226), thereby isolating the sensor and any reflector target, if provided, from the deleterious effects of external environments to which vehicle suspension systems are commonly exposed.

It will be appreciated that photon source 306 can take the form of any suitable type and/or kind of device. As one example, photon source 306 can include a laser diode. In a preferred arrangement, the laser diode can take the form of a vertical-cavity surface-emitting laser (VCSEL). It will be appreciated that photon source 306 can emit photons having any suitable wavelength, such as a wavelength in a range of from approximately six hundred fifty (650) nanometers to approximately two thousand (2000) nanometers, for example. Additionally, it will be appreciated that photon receptor 310 and reference photon detector 314 can be of any suitable type, kind and/or construction. In a preferred construction, photon receptor 310 and reference photon detector 314 can include single-photon avalanche diode (SPAD) arrays, such as are described in U.S. Pat. No. 9,995,928 discussed above.

As discussed above, the subject matter of the present disclosure can include an integrated circuit that measures instantaneous, absolute displacement based measurements using the time of flight of emitted photons. Such a construction will allow absolute distance measurement independent of target reflectance by precisely measuring the time the light takes to travel to the target reflector. Sensors in accordance with the subject matter of the present disclosure can operate within a range of displacement of from approximately zero (0) centimeters to approximately twenty (20) centimeters, with one hundred (100) centimeter ranging being possible using specific reflected target material.

It has been determined that ambient light conditions within a damper assembly can be as low as 0.5 lumens or lower. As such, a sensor in accordance with the subject matter of the present disclosure is preferably designed to function properly under ambient light conditions within a range of from approximately zero (0) lumens to full sunlight. Additionally, as it concerns target reflectors and the reflectance of target surfaces, it will be appreciated that any one of various reflector surfaces can be used. In some cases, a natural or untreated surface of an existing component having a reflectance of as low as three (3) percent could be used. In other cases, reflector surfaces can be utilized that provide improved accuracy and/or robustness of operation, such as accuracy resolution for the displacement of less than one (1) millimeter can be used. Such a sensor can be powered by a 5V voltage regulated and coupled source, with an adjustable digital output rate, such as a 16-bit digital output rate, for example, of the signal with an adjustable sample rate, such as ten (10) averaged samples. An intended operation range of this sensor can be within a temperature range of approximately −40° C. to approximately 85° C.

In some cases, details and/or specifications such as those described below can correspond to additional operating parameters and/or performance characteristics of a sensor in accordance with the subject matter presented in this application. For example, in some cases an absolute accuracy within a range of +/−4 millimeters can be used with a range of +/−1 millimeter being achieved under certain conditions of use. As another example, in some cases a relative accuracy within a range of +/−2 millimeter can be used. As a further example, in some cases a sampling period of approximately 10 milliseconds can be used in which case the sensor can report a new height or distance measurement every 10 milliseconds.

In order to meet the difficult environmental requirements associated with certain applications and/or conditions of use, a sensor assembly in accordance with the subject matter of the present disclosure can include one or more of an injection molded housing and an over-molded housing of circuitry of the sensor. In the case of injection molded housings, a single-piece clear polymeric (e.g., polycarbonate) part can be used where the printed circuit board was populated, then inserted into the housing. A potting compound can be delivered into the housing to seal the unit. The housing can have a gasket on the end nearest to the optics sensor that prevents the potting compound from entering that part of the housing and to aid against corrupting the optics and thereby creating an air cavity around the optics.

With regard to the over-molded housings, a process was developed to reduce or minimize damage to the sensitive electronic and optical parts via the application of high pressure and high temperature associated with conventional processes. To address this challenge, a low pressure over-molding solution that also used temperatures low enough to prevent damage to the PCB and other components is used. Such parts have shown excellent precision unit-to-unit since variations in the over-molded material (e.g., acrylic) can be controlled.

As an alternative, a combination of the two foregoing methods of forming a sensor body or housing could be used. In such a method of manufacture, an injection molded polycarbonate housing could be formed. Such an injection molded polycarbonate housing will form a hard enclosure that will withstand environmental conditions and satisfy performance requirements for robustly protecting any sensitive internal components of the sensor. Examples of such environmental conditions and performance requirements that an injection molded polycarbonate housing can provide include pressure, temperature, impact, vibration, chemical resistance and infrared transparency. As discussed above, the sensor body can include one or more sealing elements to form a substantially fluid-tight seal with the associated component(s) of the damper assembly.

A printed circuit board assembly (PCBA) with wires attached can then be over-molded and inserted in to the injection molded polycarbonate housing and sealed with an end cap. The over-molded material can serve as a strain relief for the wires. The over-molded material can also seal the wires to the polycarbonate housing, and fill the interior of the housing with over-molded material to reduce the internal air volume of the assembled sensor. This advantageously reduces the amount of moisture that can be present inside the sensor to potentially condense therein. Two or more of the components can be mechanically secured together using molded-in interlocking structures.

This development of a process for packaging a time-of-flight internal height sensor in accordance with the subject matter of the present disclosure is beneficial since various characteristics and/or features of the packaging material, such as the optical clarity, the distance between the time-of-flight sensor and the material used, for example, can have a direct effect on the successful operation of the sensor.

In some cases, temperature compensation can be included that will permit an output of a time-of-flight sensor (e.g., sensor 300) to be variable over different temperature ranges. In some cases, such adjustments can include compensating any data from the sensor via a compensation algorithm. This algorithm may be derived from taking distance/displacement data from multiple distances on multiple sensors over the entire operation temperature range (−40° C. to 85° C.). The temperature compensation algorithm, as part of the operational software for this internal sensor as utilized can, in some cases, contribute to the successful operation of the present invention. In some cases, such a temperature compensation algorithm can be stored in memory stores 320A and 320B and executed by processing device 318.

It is a possibility that as the displacement range increases, the linearity of the sensor is affected in that non-linearity is evident as different ranges. For that reason, it may be desirable to include a range compensation algorithm to ensure that the displacement readings are linear throughout the range. For example, it may be found that the internal height sensors are sensing a displacement of 300 millimeters while the actual displacement is 310 millimeters. Under such conditions of use, a compensation algorithm could be used that is capable of automatically correcting this difference across the entire range of detection. In some cases, such a linearity compensation algorithm can be stored in memory stores 320A and 320B and executed by processing device 318.

As described above in detail, the subject matter of the present disclosure can utilize a proximity and ambient light sensing module that is capable of performing time-of-flight based displacement measurements of emitted photons. Such sensing modules can include one or more devices that can utilize an infrared transmitter, a range sensor, and an ambient light sensor in one package. One example of such a construction is available from STMicroelectronics of Geneva, Switzerland under component designations VL6180X and/or VL530L, which may be commercially referred to as FLIGHTSENSE™ modules. It will be appreciated, however, that other devices could alternately be used.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different structures, features and/or components are presented in the embodiments shown and described herein, and that no one embodiment may be specifically shown and described as including all such structures, features and components. As such, it is to be understood that the subject matter of the present disclosure is intended to encompass any and all combinations of the different structures, features and components that are shown and described herein, and, without limitation, that any suitable arrangement of structures, features and components, in any combination, can be used. Thus, it is to be distinctly understood claims directed to any such combination of structures, features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A damper assembly having a longitudinal axis, said damper assembly comprising:
    a damper housing including a side wall portion and an end wall portion that at least partially define a damping chamber containing a quantity of non-gaseous damping fluid;
    a damper rod assembly including a damper rod and a damper piston operatively connected to said damper rod, said damper rod assembly operatively engaged with said damper housing for reciprocal displacement relative thereto; and,
    a sensor supported on said end wall portion of said damper housing with a conductor that is communicatively coupled with said sensor extending through said side wall portion of said damper housing, said sensor including a photon source and a photon receptor;
    said photon source operatively disposed in optical communication with said non-gaseous damping fluid in said damping chamber, said photon receptor operatively disposed in optical communication with said non-gaseous damping fluid in said damping chamber, said photon source operable to direct a photon through said non-gaseous damping fluid toward an associated target surface, and said photon receptor operable receive said photon reflected off the associated target surface through said non-gaseous damping fluid.

2. A damper assembly according to claim 1, wherein said end wall portion is a first end wall portion and said damper housing includes a second end wall portion spaced longitudinally from said first end wall portion, and a time-of-flight of said photon has a relation to a position of said damper piston relative to one of said first end wall portion and said second end wall portion.

3. A damper assembly according to claim 1, wherein said sensor includes a sensor housing supported on one of said end wall portion.

4. A damper assembly according to claim 3, wherein said sensor includes a source lens portion disposed in optical communication with said non-gaseous damping fluid in said damping chamber and operatively associated with said photon source to direct said photon through said non-gaseous damping fluid toward an associated target surface.

5. A damper assembly according to claim 4, wherein said sensor housing includes a sensor housing wall with said source lens portion supported on said sensor housing wall.

6. A damper assembly according to claim 5, wherein said sensor includes a substantially fluid-tight seal formed between said sensor housing wall and said source lens portion.

7. A damper assembly according to claim 3, wherein said sensor includes a receptor lens portion disposed in optical communication with said non-gaseous damping fluid in said damping chamber and operatively associated with said photon receptor to receive said photon reflected off the associated target surface through said non-gaseous damping fluid.

8. A damper assembly according to claim 7, wherein said sensor housing includes a sensor housing wall with said receptor lens portion supported on said sensor housing wall.

9. A damper assembly according to claim 1 further comprising a local electrical power source communicatively coupled with at least one of said photon source and said photon receptor.

10. A damper assembly according to claim 1 further comprising a delay detector communicatively coupled with at least one of said photon source and said photon receptor and operable to determine a time difference between an emission of said photon from said photon source and a detection of said photon at said photon receptor.

11. A damper assembly having a longitudinal axis, said damper assembly comprising:
a damper housing including a side wall portion and an end wall portion that at least partially define a damping chamber containing a quantity of non-gaseous damping fluid;
a damper rod assembly including a damper rod and a damper piston operatively connected to said damper rod, said damper rod assembly operatively engaged with said damper housing for reciprocal displacement relative thereto with said damper rod including a rod passage extending longitudinally therethrough; and,
a sensor including a photon source and a photon receptor, said sensor supported on said damper piston with a conductor that is communicatively coupled with said sensor extending along said rod passage, said photon source operatively disposed in optical communication with said non-gaseous damping fluid in said damping chamber, said photon receptor operatively disposed in optical communication with said non-gaseous damping fluid in said damping chamber, said photon source operable to direct a photon through said non-gaseous damping fluid toward an associated target surface, and said photon receptor operable receive said photon reflected off the associated target surface through said non-gaseous damping fluid.

12. A damper assembly according to claim 11, wherein a time-of-flight of said photon has a relation to a position of said damper piston relative to said damper housing.

13. A damper assembly according to claim 11 further comprising a lens portion disposed in optical communication with said non-gaseous damping fluid in said damping chamber and operatively associated with one of said photon source to direct said photon through said non-gaseous damping fluid toward the associated target surface and said photon receptor to receive said photon reflected off the associated target surface through said non-gaseous damping fluid.

14. A damper assembly according to claim 11 further comprising first lens portion disposed in optical communication with said non-gaseous damping fluid in said damping chamber and operatively associated with said photon source to direct said photon through said non-gaseous damping fluid toward the associated target surface and a second lens portion disposed in optical communication with said non-gaseous damping fluid in said damping chamber and operatively associated with said photon receptor to receive said photon reflected off the associated target surface through said non-gaseous damping fluid.

15. A damper assembly according to claim 11, wherein said sensor includes a sensor housing supported on said damper piston.

16. A spring and damper assembly comprising:
a damper assembly according to claim 11; and,
a spring device that is axially-coextensive with said damper assembly and operatively connected thereto for simultaneous extension and compression of said spring device with said damper assembly.

17. A suspension system operatively connected between an associated sprung mass and an associated unsprung mass of an associated vehicle, said suspension system comprising:
a spring device operatively connected between the associated sprung mass and the associated unsprung mass, said spring device being a gas spring assembly that contains a quantity of pressurized gas;
a damper assembly operatively connected between the associated sprung mass and the associated unsprung mass, said damper assembly having a longitudinal axis and including:
a damper housing including a side wall portion and an end wall portion that at least partially define a damping chamber containing a quantity of non-gaseous damping fluid;
a damper rod assembly including a damper rod and a damper piston operatively connected to said damper rod, said damper rod assembly operatively engaged with said damper housing for reciprocal displacement relative thereto;
a photon source operatively disposed in optical communication with said non-gaseous damping fluid in said damping chamber; and,
a photon receptor operatively disposed in optical communication with said non-gaseous damping fluid in said damping chamber;
said photon source operable to direct a photon through said non-gaseous damping fluid toward an associated target surface, and said photon receptor operable receive said photon reflected off the associated target surface through said non-gaseous damping fluid;
a control system communicatively coupled with at least one of said photon source and said photon receptor; and,
a pressurized gas system including a pressurized gas source and a control device with said pressurized gas source in selective communication with said gas spring assembly such that said control system is operable to selectively transfer pressurized gas into and out of said gas spring assembly in response to determinations of a time difference between an emission of said photon from said photon source and a detection of said photon at said photon receptor.

18. A suspension system according to claim 17, wherein a time-of-flight of said photon has a relation to a position of said damper piston relative to said damper housing.

19. A suspension system according to claim 17, wherein said damper assembly includes a first lens portion and a second lens portion, said first lens portion disposed in optical communication with said non-gaseous damping fluid in said damping chamber and operatively associated with said photon source to direct said photon through said non-gaseous damping fluid toward an associated target surface, and said second lens portion disposed in optical communication with said non-gaseous damping fluid in said damping chamber and operatively associated with said photon receptor to receive said photon reflected off the associated target surface through said non-gaseous damping fluid.

20. A suspension system according to claim 17, wherein said damper assembly includes a sensor including said photon source and said photon receptor, said sensor including a sensor housing supported on one of said end wall portion of said damper housing and said damper piston.

* * * * *